United States Patent [19]

Keith et al.

[11] Patent Number: 4,612,145
[45] Date of Patent: Sep. 16, 1986

[54] METHOD FOR PRODUCING ELECTRET-CONTAINING DEVICES

[75] Inventors: Harvey D. Keith, Summit; Heinz von Seggern, Westfield; Tsuey T. Wang, Summit; James E. West, Plainfield, all of N.J.

[73] Assignee: AT&T Bell Laboratories, Murray Hill, N.J.

[21] Appl. No.: 593,619

[22] Filed: Mar. 26, 1984

[51] Int. Cl.$^4$ .................. B29C 71/04; B29C 13/08
[52] U.S. Cl. ..................... 264/22; 29/25.35; 29/592 E; 264/24; 264/27; 264/104; 425/174.8 R
[58] Field of Search ............ 264/22, 24, 104, 105, 264/27; 425/174.8 R; 29/25.35, 592 E

[56] References Cited

U.S. PATENT DOCUMENTS

| | | | |
|---|---|---|---|
| 3,899,558 | 8/1975 | Fleming et al. | 264/104 |
| 3,943,614 | 3/1976 | Yoshikawa et al. | 264/22 |
| 4,243,460 | 1/1981 | Nagler | 264/22 |
| 4,248,808 | 2/1981 | West | 264/22 |
| 4,260,566 | 4/1981 | Brouwer et al. | 425/163 |
| 4,346,505 | 8/1982 | Lemonon et al. | 264/22 |
| 4,379,098 | 4/1983 | Gumienny | 264/104 |

OTHER PUBLICATIONS

"Polarization of (PVF$_2$) by Application of Breakdown Fields", J. Appl. Phys. 53(10), Oct., 1982, pp. 6552-6556 ... Wang et al.

"Piezoelectricity in $\beta$-Phase (PVF$_2$) Having a Single-Crystal Orientation", J. Appl. Phys. 50(10), Oct. 1979, Wang, pp. 6091-6094 ...

Primary Examiner—Jeffery Thurlow
Attorney, Agent, or Firm—Bernard Tiegerman

[57] ABSTRACT

A new method for fabricating electret-containing devices is disclosed. The inventive method includes a new technique for fabricating electrets, which involves applying a voltage across an electrically polarizable body. Large-scale breakdown effects in the body are avoided by reducing the voltage across at least a portion of the body undergoing polarization in response to a current indicating the onset of a breakdown in the body.

9 Claims, 7 Drawing Figures

METHOD FOR PRODUCING ELECTRET-CONTAINING DEVICES

BACKGROUND OF THE INVENTION

1. Field of the Invention

The invention pertains to a method for polarizing materials to produce electrets for devices.

2. Art Background

Electrets are used in a wide variety of devices such as transducer devices, transformers, electric motors, and xerographic copying machines. (Electrets, for purposes of this disclosure, are electrically polarized bodies whose polarization persists after being produced.) The electret-containing transducer devices include, for example, microphones, loudspeakers, pressure sensors, touch sensitive keyboards and heat sensors. Furthermore, transducer devices such as electrostatic microphones or loudspeakers often include a thin film electret as the vibrating element of the device.

Materials employed in electrets are not inherently polarized but are polarizable. There are a wide variety of techniques for producing the desired polarization. For example, charges are injected into charge traps within or on the surface of the polarizable material, free charges are separated within the material, or dipoles of the material are aligned. Materials suitable for electrets and polarizable by charge injection techniques include polyesters such as polyethylene terephthalate and fluorocarbons such as fluorinated polyolefins. Polyvinylidene fluoride (PVDF) is exemplary of electret materials which are polarized by aligning dipoles of the material. Polarized PVDF is a commonly employed electret material because it exhibits both piezoelectric (an electrical signal is produced in response to an applied stress) and pyroelectric (an electrical signal is produced in response to heat) properties.

One technique for polarizing a body, e.g., a sheet, of polarizable material for electret fabrication involves placing the body between two conducting, e.g., metal, electrodes, and applying a voltage across the electrodes. If the body includes free charges or unoriented dipoles, then the electric field existing between the electrodes induces the charge separation or dipole alignment necessary to achieve polarization. If the body includes charge traps, then placing the body in contact with one of the metal electrodes results in a flow of charges from the electrode into the charge traps, also producing polarization.

One problem often encountered with the previously described polarization technique is large-scale dielectric breakdown. This typically results in the destruction of a significant portion of the polarizable body (a hole several millimeters in diameter is burned through the body) and results in either no polarization or an undesirably low degree of polarization in the undamaged portions of the body. It is believed that breakdown is generally initiated in a region of the body exhibiting a defect leading to reduced electrical resistance, e.g., a pinhole, decreased thickness, or low dielectric strength. A sufficiently large, applied polarizing voltage produces a short circuit (of charges distributed on the surfaces of the electrodes facing the sheet) through the defective region, reducing the polarizing voltage across the nondefective portions of the sheet, and thus precluding effective polarization. The short circuit also involves an avalanche-like effect which first produces a hole typically several micrometers in diameter through the body, and ultimately leads to catastrophic failure.

A method for mitigating the effects of breakdown as described by T. T. Wang and J. E. West in "Polarization of poly(vinylidene fluoride) by application of breakdown fields", *Journal of Applied Physics*, 53 (10), 1982, involves inserting a layer of dielectric material, e.g., a layer of soda-lime glass, between the body of material to be polarized and one of the conducting electrodes. (The dielectric insert either directly contacts one surface of the sheet, or a metallized surface of the sheet.) Breakdown, if it occurs, is thus limited to a relatively small region, typically no more than a few micrometers in diameter, and polarization occurs in the remaining portions of the sheet.

It is established doctrine that the dielectric insert functions as distributed resistive elements, and that only such distributed resistance prevents large-scale breadown. That is, each volume of the dielectric insert resistively limits current flow through an adjacent coextensive volume of the polarizable material. Thus, the dielectric insert allows a higher polarizing voltage across each volume without breakdown and results in a concomitant enhanced degree of polarization. Additionally, the dielectric insert resistively inhibits lateral current flow along the insert-electrode interface (provided the sheet is unmetallized, or is metallized and has suffered a local breakdown producing a discontinuity in the metal adjacent the breakdown region). Thus, in the event of a local breakdown, adverse consequences are limited by preventing charges distributed on the electrode surface from flowing along the insert-electrode interface to the local breakdown region.

While the use of a dielectric insert has many advantages, improvements are possible. For example, a greater degree of polarization uniformity, and shorter polarization times (the time required to achieve the desired degree of polarization) are desirable.

SUMMARY OF THE INVENTION

The invention involves the finding that breakdown is prevented during polarization by reducing the applied polarizing voltage rather than, as in the dielectric insert technique, retarding breakdown currents and affirmatively maintaining voltage levels. This voltage reduction is effected across at least a portion (most likely to suffer breakdown), and preferably all, of the material being polarized, in response to a current indicating the onset of a breakdown in the material. Reducing the voltage reduces the likelihood of breakdown and, surprisingly, still permits polarization to be achieved. Moreover, polarization uniformity is enhanced and processing time is reduced, relative to the dielectric insert technique.

One apparatus for implementing the inventive polarization method includes a conventional feedback control device which automatically reduces the applied polarizing voltage in response to the onset of a breakdown. A specific embodiment of such a device includes, for example, a discrete (rather than distributed) resistor in the closed circuit path between a voltage source and the material being polarized. If a breakdown is initiated in the polarizable material, then there is a related increase in the current normally flowing through the resistor during polarization. Consequently, the voltage across the material is necessarily, and automatically, reduced by the increase in the voltage drop across the resistor.

BRIEF DESCRIPTION OF THE DRAWINGS

The invention is described with reference to the accompanying drawings wherein.

DETAILED DESCRIPTION

The invention involves a new method for fabricating electret-containing devices, which method includes a new technique for polarizing polarizable bodies to produce electrets. The invention also involves the devices fabricated in accordance with the inventive method.

Figure 1:
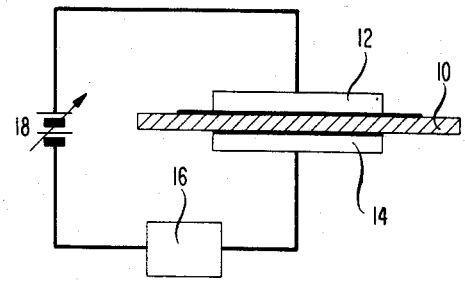
FIGS. 1-2 are schematic diagrams of apparatus for implementing the inventive fabrication method.

The electret (of the electret-containing device) is formed, in accordance with the invention, by applying a voltage across a polarizable body. This voltage is applied, for example, by placing the polarizable body 10 (see FIG. 1) between electrically conductive, e.g., metal, electrodes 12 and 14, and applying a voltage across the electrodes. However, and unlike the dielectric insert technique, the likelihood of breakdown in the polarizable body 10 is reduced, according to the invention, by reducing the applied voltage across at least a portion, and preferably all, of the body 10 undergoing polarization in response to the onset of a breakdown in the body 10. The size of the portion, e.g., the length or width of the portion, is preferably larger than, or equal to, about 10 $\mu$m to avoid undesirably large nonuniformities in the resulting polarization (achieved under the influence of the reduced voltage) of the portion.

Figure 3:
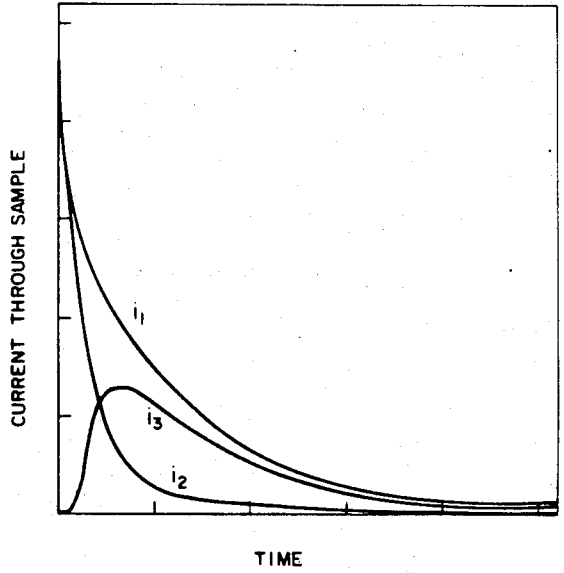
FIG. 3 is a plot of the current, as a function of time, which typically flows through a polarizable body during polarization, in the absence of breakdowns.

The onset of a breakdown is readily detected by sensing (using conventional techniques) the current flowing through the (initially unpolarized or partially polarized) body 10 during polarization, and comparing this current with a reference current which would flow in the absence of breakdown. A typical plot of a current exhibiting no breakdown, as a function of time, is shown in FIG. 3, and is labeled $i_1$. This current consists of the sum of a current labeled $i_2$ in FIG. 3, associated with the capacitance, C, of the body 10, and a current labeled $i_3$ in FIG. 3, associated with the production of persistent polarization. To determine when the voltage should be reduced, a plot of the current $i_1$ which would flow in the absence of breakdown is obtained, prior to the polarization of the (unpolarized or partially polarized) body 10, by subjecting a statistically significant number of unpolarized (or partially polarized) control samples to the polarizing voltage, and graphing the average of the resulting, measured currents as a function of time. The current $i_2$ is obtained by subjecting these same, polarized (to the desired degree) control samples to the same voltage, and again graphing the average of the resulting, measured currents. The $i_3$ current is just the difference of these two, average currents. It has been found that the onset of a breakdown is signaled by a sharp, upward deviation in the monitored current from the reference $i_1$ current. A deviation from the reference current indicating the onset of breakdown is an amount greater than the maximum amplitude of the $i_3$ curve (denoted $I_3$ in FIG. 3). Generally, such an amount is reached within a period of time less than about 10 milliseconds ($10 \times 10^{-3}$ seconds), and typically less than about 200 nanoseconds ($200 \times 10^{-9}$ seconds), after the initiation of the deviation.

A voltage reduction is effective in reducing the likelihood of a breakdown if: (1) it is large enough to reduce the deviation (from the reference current) to a size less than, or equal to, the peak amplitude of the $i_3$ curve; and (2) this reduction in the amplitude of the deviation is effected within about 10 milliseconds, and preferably within about 200 nanoseconds, and more preferably within about 20 nanoseconds, from the time when the deviation from the reference curve exceeds the peak $i_3$ amplitude. Both the voltage reduction and the time period over which it is produced, needed to achieve objectives (1) and (2), are generally determined empirically by monitoring the onset of breakdowns in control samples and applying varying voltage reductions over varying periods of time.

An apparatus for automatically reducing the applied voltage in response to the onset of a breakdown includes, for example, a conventional feedback control circuit 16 (pictured as a box in FIG. 1) which automatically reduces the voltage of a variable voltage source 18 in response to a current deviation in the body 10, described above. While the feedback control circuit 16 and the variable voltage source 18 are pictured as being separate components, in practice they are often manufactured as a single, integral unit.

Figure 2:
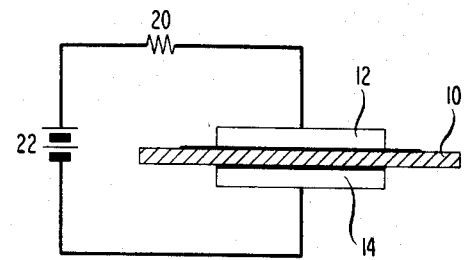

A particular type of feedback control circuit 16 which automatically reduces the applied voltage in response to the onset of a breakdown is schematically depicted in FIG. 2 and includes a resistor 20 (having an essentially zero response time) in the circuit path between a constant voltage source 22 and the polarizable body 10. Because the body 10, electrodes 12 and 14, resistor 20 and voltage source 22 form a closed circuit loop, whatever current flows through the body 10 must necessarily also flow through the resistor 20. Consequently, the increment in current flowing through the resistor 20 in response to the onset of a breakdown in the body 10 necessarily results in an essentially instantaneous voltage drop across the body equal to the increase in the voltage drop across the resistor.

It has been found that the use of a resistor 20 as the feedback control device is particularly advantageous because reductions in the resistance of the resistor produce reductions in polarization time. Consequently, by choosing an appropriate resistor, the time required to achieve a desired degree of polarization in a particular material, and for a particular applied voltage, is generally less than when using a dielectric insert.

The resistance of the resistor 20 is limited by two considerations. The first of these is that the resistance should be large enough to prevent, or at least reduce the possibility of, large-scale breakdown. The second consideration is that any voltage drop across the resistor (if it occurs) should not be so large that the voltage across the polarizable body 10 is undesirably reduced (the smaller the voltage across the body 10, the smaller the degree of polarization). Within the bounds defined by these two considerations, the resistance is chosen to take on any value. Typically, however, the resistance is chosen, empirically (by applying polarizing voltages to control samples through resistors of different resistance and measuring the resulting polarizations over varying periods of time), to achieve the desired polarization within as small a time as is compatible with other processing considerations.

The resistance of the resistor 20 is chosen in relation to the material properties and dimensions of the body 10. In practice, the polarizable bodies 10 include materials having resistivities greater than about $10^8$ ohm-m and relative dielectric constants greater than about 1.5. Moreover, these bodies are typically sheets having thicknesses ranging from about 1 μm to about 1 cm, and surface areas (the multiple of the length and width) ranging from about $10^{-10}$ m² to about 1 m². Consequently, these bodies have resistances greater than about 100 ohms and capacitances, C, greater than about $1.5 \times 10^{-19}$ farads. Materials having resistivities less than about $10^8$ ohm-m or relative dielectric constants less than about 1.5, are undesirable because they are difficult to polarize. Sheet thicknesses less than about 1 μm are undesirable because the probability of breakdown is undesirably high, while sheet thicknesses greater than about 1 cm are undesirable because undesirably large voltages are needed to polarize such sheets. Sheets having surface areas less than about $10^{-10}$ m² are undesirable because they are difficult to handle and exhibit undesirably large polarization nonuniformities. Sheets having surface areas greater than about 1 m² are undesirable because they exhibit an undesirably large number of manufacturing defects, e.g., pinholes.

For polarizable bodies having the above properties and dimensions, the resistance, R, of the resistor 20 ranges from about 10 ohms to about $10^{20}$ ohms, and preferably ranges from about $10^4$ to about $10^{14}$ ohms. Resistances less than about 10 ohms are undesirable because the likelihood of breakdown is undesirably high. Resistances greater than about $10^{20}$ ohms are undesirable because they result in undesirably long polarization times and result in undesirably small voltages across the polarizable body 10 in the event of a local breakdown.

In the case of, for example, a sheet of PVDF (PVDF has a resistivity of about $10^{12}$ ohm-m and a relative dielectric constant of about 12), the thickness ranges from about 1 μm to about 1 cm, and the surface area ranges from about $10^{-10}$ m² to about 1 m², leading to resistances (of the sheet) which range from about $10^6$ to about $10^{20}$ ohms and capacitances which range from about $10^{-18}$ to about $10^{-4}$ farads. Thicknesses and surface areas outside the above ranges are undesirable for the reasons given above. For a PVDF sheet having the above dimensions, the resistance of the resistor 20 ranges from about $10^6$ to about $10^{20}$ ohms. Resistances outside the above range are undesirable for the reasons given above.

While the above discussion has been limited to using a voltage reduction means, the use of a voltage reduction in combination with other expedients such as a dielectric insert is not precluded and is often desirable because it decreases the level of voltage reduction required.

After the polarization of the body 10 to produce the electret, the device, which includes the electret, is completed by a series of conventional steps (which differ depending on the nature of the device), as described, for example, by G. M. Sessler and J. E. West in "Electrets", *Topics in Applied Physics*, 33, G. M. Sessler, ed., (Springer, N.Y.), 1980.

EXAMPLE 1

For purposes of comparison, polarization results obtained with a dielectric insert are described below.

Square PVDF sheets, each 9 cm in width and 9 cm in length, were cut from a roll of 25 μm-thick, biaxially oriented (the material had been stretched in two perpendicular directions) capacitor-grade film produced by the Kureha Chemical Company of Tokyo, Japan. These sheets were cleaned with trichloroethane, and then circular aluminum electrodes, about 100 nm in thickness and 6.5 cm in diameter, were vacuum deposited onto opposite faces of each sheet, leaving an unmetallized border to prevent flashover (arcing) during the ensuing polarization procedure.

The PVDF sheets were placed (one at a time) on a square plate of soda lime glass (the dielectric insert) having a thickness of 0.24 cm and a length and width of 15 cm, arranged between two circular brass electrodes. Each electrode had a thickness of 1.3 cm and a diameter of 6.5 cm. The PVDF sheets were then polarized (at room temperature) by applying a dc voltage of 10, 15, 18.5, 21.5, 24.5 or 30 kilovolts across the brass electrodes, for periods of time ranging from about 2.5 minutes to about 3 hours.

After being polarized, the PVDF sheets were stored, at room temperature, in a short-circuit condition (the circular aluminum electrodes were electrically connected to one another) for about 16 hours.

Figure 4:
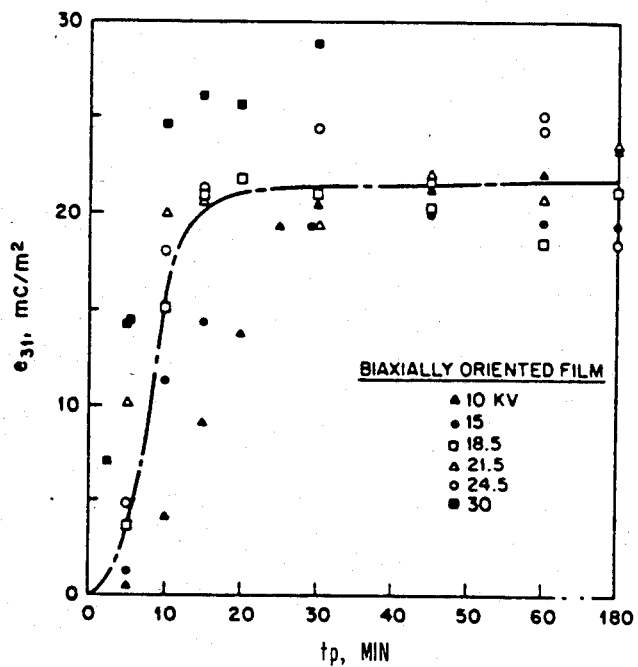
FIG. 4 depicts polarization data obtained using a dielectric insert.

Upon removal from storage, the degree of polarization achieved by each PVDF sheet was determined by measuring the piezoelectric activity, i.e., the piezoelectric strain coefficient, $d_{31}$, of each sheet. ($d_{31} = \partial P_3/\partial \sigma_{11}$ where $P_3$ denotes the polarization in the "3" direction and $\sigma_{11}$ denotes the stress applied in the "1" direction to a surface whose normal is parallel to the "1" direction. As is conventional, the "3" direction is parallel to the surface normal of each sheet while the "1" direction is aligned with the longitudinal direction of the as-received roll of film.) The piezoelectric measurements were performed by applying a sinusoidal strain with a frequency of 110 Hz and an amplitude of 0.036 percent (regarding this technique see, e.g., T. T. Wang, *Journal of Applied Physics*, 50, 6091 (1979)). The measured results are depicted in FIG. 4 which is a plot of the apparent piezoelectric stress coefficient, $e_{31}(e_{31} = E_{11}d_{31}$, where $E_{11}$ is the Young's modulus for PVDF) as a function of polarization time, tp, for the various voltages employed. For the maximum applied voltage of 30 KV, the $e_{31}$ coefficient reaches a value of 29 mC/m² after 30 minutes.

EXAMPLE 2

The polarization results obtained using an external resistor, rather than a dielectric insert, are described below.

Square PVDF sheets, each 12 cm in width and 12 cm in length, were cut from a roll of 25 μm-thick, biaxially oriented capacitor-grade film produced by the Kureha Chemical Company. These sheets were cleaned with trichloroethane, and then circular aluminum electrodes, about 100 nm in thickness and 6 cm in diameter, were evaporated onto the opposite faces of each sheet, leaving an unmetallized border area at least 3 cm wide.

Figure 5:
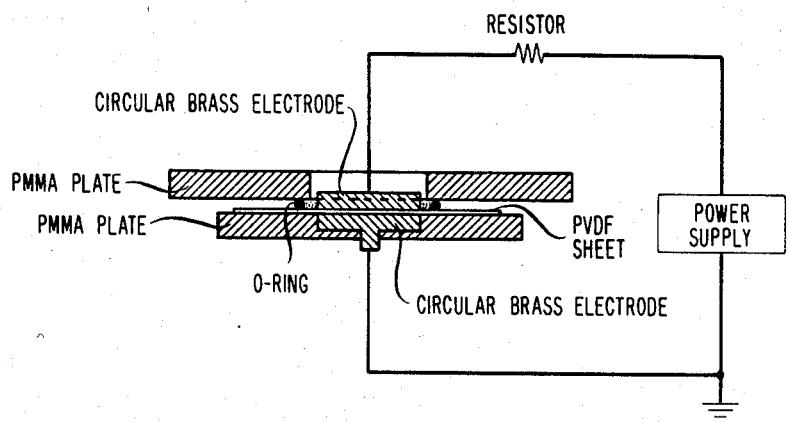
FIG. 5 is a schematic diagram of a polarization apparatus, which includes a discrete resistor in place of a dielectric insert, used to obtain the polarization data shown in FIGS. 6-7.

The apparatus used to polarize each PVDF sheet is depicted in FIG. 5 and was similar to that used in Example 1 except for the absence of the plate of soda lime glass (the dielectric insert) and the insertion of one of several resistors, purchased from the Beman Company of New Cumberland, Pa., between the power supply and one of the brass electrodes. The apparatus also included a lower plate of polymethyl methacrylate (PMMA) supporting the lower brass electrode, as well as an upper PMMA plate resting on a silicone O-ring supported by the PVDF sheet, which included a central aperture allowing the plate to clear the upper brass electrode. The purpose of the PMMA plates was to prevent flashover (arcing) around the sheet edges.

The PVDF sheets were polarized (at room temperature) by applying a dc voltage ranging from 5 to 30 KV across the brass electrodes, for periods of time ranging from 1 to $10^5$ seconds, using resistors whose resistances, R, ranged from $5 \times 10^7$ ohms to $10^{11}$ ohms.

After being polarized, the PVDF sheets were stored in a short-circuit condition at room temperature for more than 72 hours, and cut into rectangular pieces having lengths of 0.45 cm and widths of 5.3 cm. The piezoelectric activity of each sheet was then measured, as in Example 1.

Figure 6:
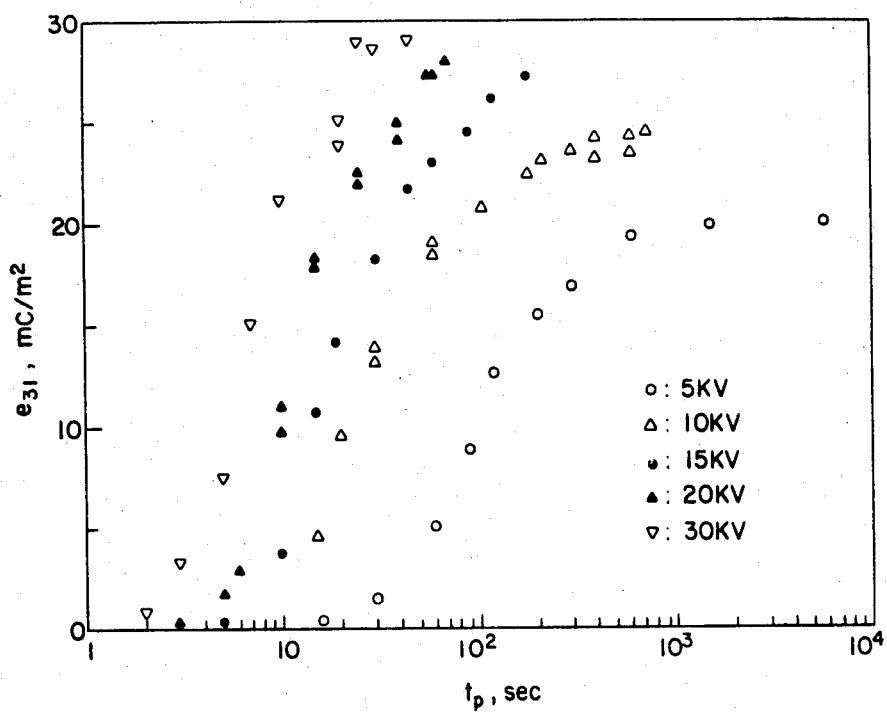

A plot of the apparent piezoelectric stress coefficient, $e_{31}$, as a function of polarization time, tp, obtained at various applied voltages, with $R = 10^9$ ohms, is depicted in FIG. 6. It can be seen that while the $e_{31}$ for each applied voltage rises with polarization time, it tends to saturate at a progressively higher value with increasing voltage. The maximum $e_{31}$ value obtained at 30 KV is 29 mC/m$^2$, which is about the same maximum obtained in Example 1 using the same voltage. However, a polarization time of only 25 seconds was needed to achieve the maximum $e_{31}$ in the present case, whereas 30 minutes was needed to achieve this maximum in Example 1.

Comparison of other $e_{31}$ data in FIG. 6 with the corresponding results obtained in Example 1 shows that the time required to achieve the same $e_{31}$ value at a given applied voltage is always shorter using the present method than the method used in Example 1.

Figure 7:
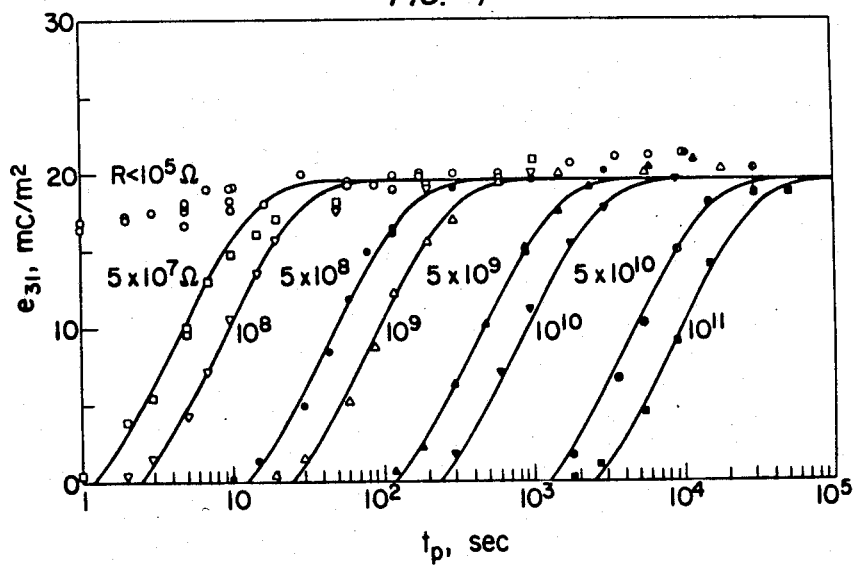

The $e_{31}$ data obtained from samples polarized with an applied voltage of 5 KV, but using resistors with R ranging from $5 \times 10^7$ to $10^{11}$ ohms, is shown in FIG. 7. Also shown are the corresponding data for PVDF sheets prepared using $R < 10^5$ ohms (regarding this data see T. T. Wang and H. von Seggern, *Journal of Applied Physics*, 54, 4602 (1983)). As is evident, the $e_{31}$ curve for each R rises with polarization time and gradually approaches the corresponding curve for $R < 10^5$ ohms. This is due to the fact that the same voltage was applied in each case, and thus the same degree of polarization, and therefore the same $e_{31}$ coefficient, is ultimately (after a long enough polarization time) achieved in each case. Moreover, all the $e_{31}$ curves seem to have about the same shape except for a horizontal shift which increases as R increases. That is, as R increases, the time required to achieve the same degree of polarization, i.e., same value of $e_{31}$, increases.

What is claimed is:

1. A method for fabricating a device, comprising the steps of:
   at least partially fabricating said device; and
   further fabricating said device by applying a voltage across an electrically polarizable body to produce a polarization, or an increased degree of polarization, in said body which persists after removal of said voltage, Characterized In That
   said method further comprises the steps of reducing the voltage across at least a portion of said body undergoing polarization in response to a current indicating the onset of a breakdown in said body, and discontinuing the application of a voltage to said body after a finite time period of sufficient duration to produce said polarization or increased degree of polarization, said voltage reduction being effected with an apparatus positioned in the path of said current and exhibiting an impedance which is chosen, in relation to material properties and dimensions of said body, to both reduce said applied voltage in response to said current and to achieve a duration of said finite time period which is sufficiently small that either said time period does not limit the rate at which said device is fabricated or is substantially minimized.

2. The method of claim 1 wherein said apparatus includes a feedback control device in electrical communication with said body, and said applied voltage is produced by a voltage source which is in electrical communication with said feedback control device, said feedback control device functioning to reduce the voltage across said body in response to said current.

3. The method of claim 2 wherein said feedback control device reduces the voltage output of said voltage source in response to said current.

4. The method of claim 2 wherein said feedback control device includes a resistor.

5. The method of claim 4 wherein the resistance of said resistor ranges from about 10 to about $10^{20}$ ohms.

6. The method of claim 5 wherein the resistance of said resistor ranges from about $10^4$ to about $10^{14}$ ohms.

7. The method of claim 4 wherein said body includes polyvinylidene fluoride.

8. The method of claim 7 wherein the resistance of said resistor ranges from about $10^6$ to about $10^{20}$ ohms.

9. The method of claim 1 further comprising the step of completing the fabrication of said device.

* * * * *